United States Patent
Lee et al.

(10) Patent No.: US 11,727,450 B2
(45) Date of Patent: Aug. 15, 2023

(54) SINGULARITY RECOMMENDATION ENGINE

(71) Applicant: KYNDRYL, INC., New York, NY (US)

(72) Inventors: Yu Kit Lee, Kuala Lumpur (MY); Shankar Swaminathan, Cyberjaya (MY); Luis Carlos Cruz Huertas, Singapore (SG); Wee Siang Yeap, Kota Damansara (MY)

(73) Assignee: KYNDRYL, INC., New York, NY (US)

( * ) Notice: Subject to any disclaimer, the term of this patent is extended or adjusted under 35 U.S.C. 154(b) by 4 days.

(21) Appl. No.: 17/032,511

(22) Filed: Sep. 25, 2020

(65) Prior Publication Data
US 2022/0101392 A1    Mar. 31, 2022

(51) Int. Cl.
*G06Q 30/02* (2023.01)
*G06Q 30/0282* (2023.01)
(Continued)

(52) U.S. Cl.
CPC ..... *G06Q 30/0282* (2013.01); *G06F 16/9558* (2019.01); *G06Q 30/0261* (2013.01); *G06Q 30/0269* (2013.01)

(58) Field of Classification Search
CPC ................. G06Q 30/02–0277; G06F 16/9558
See application file for complete search history.

(56) References Cited

U.S. PATENT DOCUMENTS

2011/0231225 A1    9/2011    Winters
2012/0271717 A1    10/2012    Postrel
(Continued)

FOREIGN PATENT DOCUMENTS

AU    2016206411 A1    8/2016
CN    102077228 A    5/2011
(Continued)

OTHER PUBLICATIONS

Mell et al., "The NIST Definition of Cloud Computing", National Institute of Standards and Technology, Special Publication 800-145, Sep. 2011, pp. 1-7.

*Primary Examiner* — Raquel Alvarez
(74) *Attorney, Agent, or Firm* — Erik Swanson; Andrew M. Calderon; Calderon Safran & Cole, P.C.

(57) ABSTRACT

A method for generating a singularity recommendation includes receiving structured and unstructured data for a user, where the structured and unstructured data for the user provide a first context for generating a singularity recommendation. The method, responsive to identifying a location for the user, determines ecosystem data based on the location for the user, where the ecosystem data provides a second context for generating the singularity recommendation. The method determines environmental data based on the location for the user, where the environmental data provides a second context for generating the singularity recommendation. The method generates the singularity recommendation based on the first context, the second context, and the third context directed to the user. The method displays the singularity recommendation in a user interface on a client device associated with the user.

14 Claims, 6 Drawing Sheets

(51) Int. Cl.
*G06F 16/955* (2019.01)
*G06Q 30/0251* (2023.01)

(56) References Cited

U.S. PATENT DOCUMENTS

| | | |
|---|---|---|
| 2014/0222506 A1 | 8/2014 | Frazer |
| 2016/0283971 A1 | 9/2016 | Ernster |
| 2019/0102684 A1* | 4/2019 | Beran .................... G06N 3/008 |
| 2020/0012958 A1 | 1/2020 | Natanson |
| 2021/0342927 A1* | 11/2021 | Morin ................ G06Q 30/0277 |

FOREIGN PATENT DOCUMENTS

| | | |
|---|---|---|
| CN | 108550055 A | 9/2018 |
| KR | 20170126029 A | 8/2018 |

* cited by examiner

US 11,727,450 B2

SINGULARITY RECOMMENDATION ENGINE

FIELD OF INVENTION

This disclosure relates generally to user recommendations and in particular to a singularity recommendation engine for generating user recommendations.

BACKGROUND OF THE INVENTION

Targeted content is primarily user demographic and consumption based, where targeted content takes into account browser history, purchase history, and other recent online activity for the user. For example, the user can search for a particular product utilizing a search tool and receive targeted content for the particular product and similar products based on the search. The targeted content is typically focused on certain traits and users who are likely to have a strong preference will receive the targeted content compared to those who have little interest and preferences that do not match a product's attributes.

SUMMARY

Embodiments in accordance with the present invention disclose a method, computer program product and computer system for generating a singularity recommendation, the method, computer program product and computer system can receive structured and unstructured data for a user, wherein the structured and unstructured data for the user provide a first context for generating a singularity recommendation. The method, computer program product and computer system can responsive to identifying a location for the user, determine ecosystem data based on the location for the user, wherein the ecosystem data provides a second context for generating the singularity recommendation. The method, computer program product and computer system can determine environmental data based on the location for the user, where the environmental data provides a second context for generating the singularity recommendation. The method, computer program product and computer system can generate the singularity recommendation based on the first context, the second context, and the third context directed to the user. The method, computer program product and computer system can display the singularity recommendation in a user interface on a client device associated with the user.

DETAILED DESCRIPTION

Embodiments of the present invention provide a singularity recommendation to a user by pinpointing a singularity moment for the user in a particular point in time and generating the singularity recommendation based on a relevant set of information for utilization by the user at the particular point in time. A singularity recommendation program can receive structured and unstructured data for the user, which includes personal information for the user and provides a first context for generating a singularity recommendation. The singularity recommendation program can identify a location of the user and determine ecosystem data based on the identified location for the user, where the ecosystem data provides a second context for generating the singularity recommendation. Subsequently, the singularity recommendation program determines environmental data based on the identified location for the user by sourcing the environmental data from publicly available sources, where the environmental data provides a third context for generating the singularity recommendation. The singularity recommendation program generates the singularity recommendation based on the contexts and displays the singularity recommendation to the user, where the singularity recommendation program can perform an action based on the generated singularity recommendation and a confirmation from the user.

Figure 1:
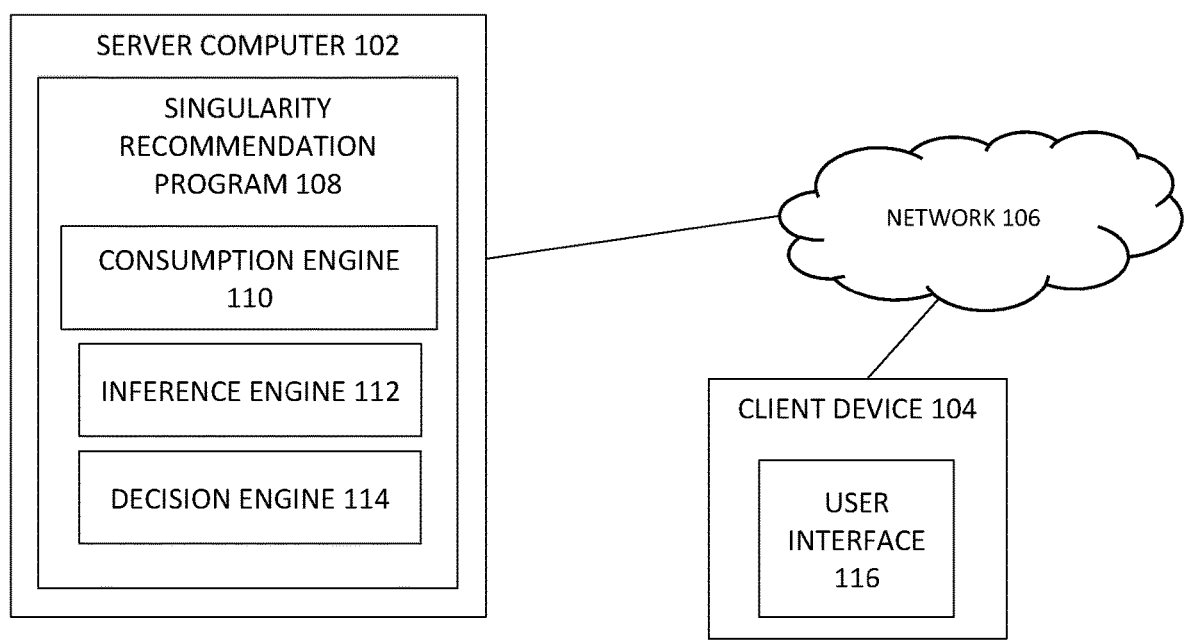
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and client device 104 all interconnected over network 106.

Server computer 102 may be a desktop computer, a laptop computer, a tablet computer, a specialized computer server, a smartphone, or any computer system capable of executing the various embodiments of singularity recommendation program 108. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. Server computer 102 has the ability to communicate with other computer devices (not illustrated in FIG. 1) to query the computer devices for information. In this embodiment, server computer 102 includes singularity recommendation program 108 with consumption engine 110, inference engine 112, and decision engine 114.

Client device 104 may be a cellphone, smartphone, smartwatch, laptop, tablet computer, or any other electronic device capable of communicating via network 106. In general, client device 104 represents one or more programmable electronic devices or combination of programmable electronic devices capable of executing machine readable program instructions and communicating with other computing devices (not shown) within distributed data processing environment via a network, such as network 106. In one embodiment, client computing device 104 represents one or more devices associated with a user. Client device 104 includes user interface 116, where user interface 116 enable a user of client device 104 to interact with singularity recommendation program 108 on server computer 102.

Singularity recommendation program 108 generates a singularity recommendation for a user by receiving structured and unstructured data for the user based on established security preferences. Singularity recommendation program 108 utilizes structured and unstructured data to establish a first context and can include consumption data, financial data, behavioral data, relationship data, and any other user specific data accessible by singularity recommendation program 108 based on the established security preferences. Singularity recommendation program 108 identifies a location for the user and determines ecosystem data based on the identified location for the user to establish a second context, where the ecosystem data can include retail information, services information, entertainment information, and other identifiable product information based on the determined location. Subsequently, singularity recommendation program 108 determines environmental data for the user based on the identified location for the user to establish a third context, where environmental data includes climate data, locality data (e.g., legislative), and social data (e.g., current new, fashion trends). Singularity recommendation program 108 generates a singularity recommendation based on the first context, the second context, and the third context directed to the user, where singularity recommendation program 108 displays the generated singularity recommendation in user interface 116 on client device 104 associated with the user. Singularity recommendation program 108 stores any changes received from the user to the generated singularity recommendation and performs an action based on the generated singularity recommendation.

Singularity recommendation program 108 utilizes consumption engine 110 to receive the structured and unstructured data for the user and identify relationships between the various data types. Singularity recommendation program 108 utilizes inference engine 112 to determine behavioral patterns of a user based on the structured and unstructured data, where singularity recommendation program 108 utilizes the determined behavioral patterns to generate the singularity recommendation. Singularity recommendation program 108 utilizes decision engine 114 to generate the singularity recommendation based on relationships identified by consumption engine 110 and behavioral patterns of the user determines by inference engine 112.

In general, network 106 can be any combination of connections and protocols that will support communications between server computer 102 and client device 104. Network 106 can include, for example, a local area network (LAN), a wide area network (WAN), such as the internet, a cellular network, or any combination of the preceding, and can further include wired, wireless, and/or fiber optic connections. In one embodiment, singularity recommendation program 108 can be a web service accessible via network 106 to a user of client device 104. In another embodiment, singularity recommendation program 108 may be operated directly by a user of server computer 102.

Figure 2:
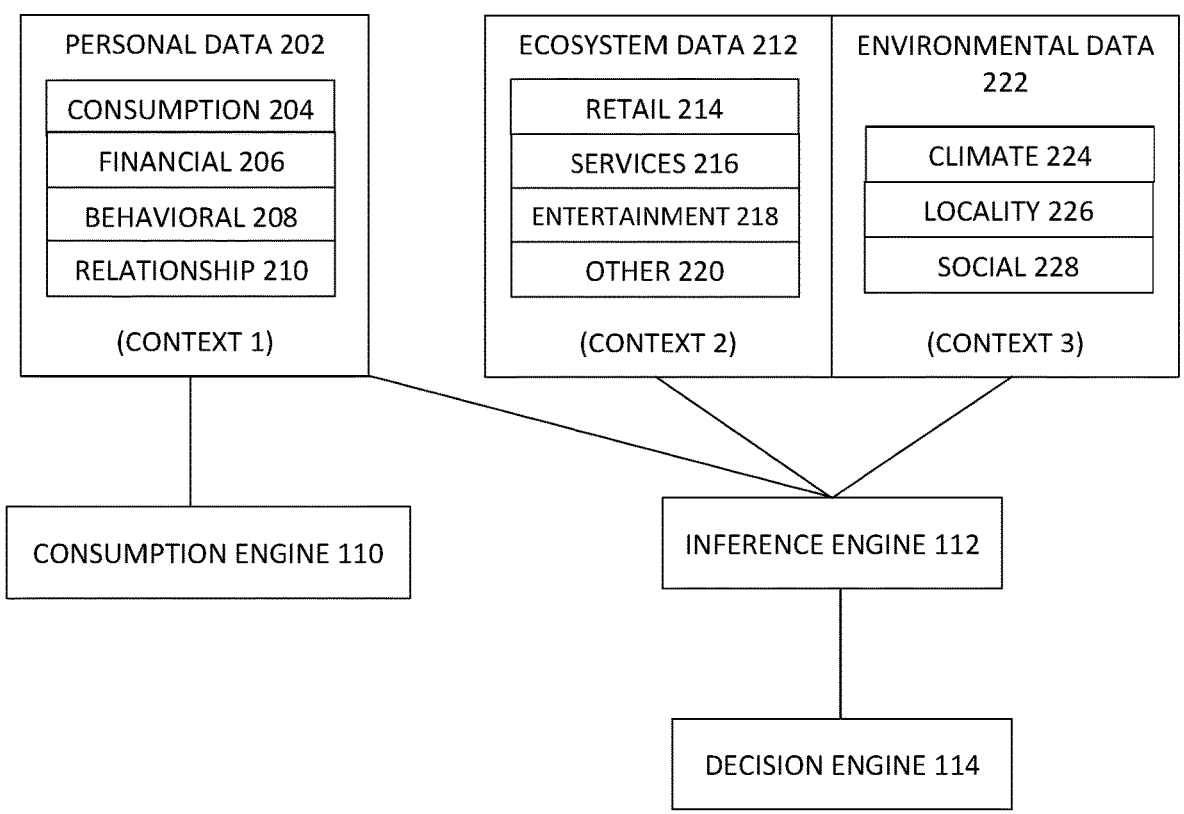
FIG. 2 is a system diagram of multiple contexts utilized by a singularity recommendation program, in accordance with an embodiment of the present invention.

FIG. 2 is a system diagram of multiple contexts utilized by a singularity recommendation program, in accordance with an embodiment of the present invention.

Personal data 202 represents the structured and the unstructured data that the singularity recommendation program receives for the user based on established security preferences for sharing of personal data associated with the user. Personal data 202 provides a first context for a singularity recommendation that the singularity recommendation program generates. In this embodiment, personal data 202 includes consumption data 204, financial data 206, behavioral data 208, and relationship data 210. Consumption data 204 includes purchase information for the user for various products and services that can include items such as, subscription streaming services, product purchases on ecommerce websites, product purchases at physical locations (e.g., grocery stores, hardware stores), and any other financially trackable consumable by the user. Financial data 206 includes budgetary information for the user provided by a financial institution or financial tracking tool. Financial data 206 can include items such as, financial statements (e.g., bank, credit card, online payment system), financial goals for spending (weekly, monthly, quarterly etc.), financial goals for savings (weekly, monthly, quarterly etc.), and any other budgetary information the singularity recommendation program has permission to access for the user based on the established security preferences.

Behavioral data 208 includes social information for the user provided by one or more of social media websites, social forums, gaming platforms, and enterprise communication systems. Behavioral data 208 can includes item such as, geotags associated with posts by the user, content subscriptions (e.g., video channels, chat channels), businesses of interest, topics of interest, content of interest, and any other social information associated with the user. Relationship data 210 includes relation information between the user and one or more other users, along with event information including the user and the one or more other users sourced from available calendar information and online channels (e.g., social media websites, enterprise communication systems). Relation information indicates how the user is associated with the one or more other user (e.g., coworker, family, hired service employee) and event information includes various past and future events involving the user. For example, a past event can include a previous reservation to a restaurant for a business meeting in New York City and a future event can include a scheduled business meeting in Shanghai with a to be determined location.

Ecosystem data 212 represents potential products and services available to the user based on a location that the singularity recommendation program identifies for the user, where ecosystem data 212 can be categorized in geolocation clusters. For example, the singularity recommendation program identifies a location for the user as the international airport in Tokyo, Japan when a mobile device (i.e., client device 104) connects to the local cellular network or public Wi-Fi. The singularity recommendation program can utilize a general cluster of ecosystem data 212 for Japan (i.e., country based) and a subcluster of ecosystem data 212 for Tokyo (i.e., city based). Furthermore, the subcluster of ecosystem data 212 can be further divided into portion based on neighborhoods or general areas within the subcluster, therefore ecosystem data 212 that is most relevant to the user is determined by the singularity recommendation program. Ecosystem data 212 provides a second context for the singularity recommendation that the singularity recommendation program generates. In this embodiment, ecosystem data 212 includes retail data 214, services data 216, entertainment data 218, and other data 220.

Retail data 214 includes local retail information based on the identified location for the user and can include items such as, restaurants and retailers. Services data 216 includes service industry information based on the identified location for the user and can include items such as, ride shares (i.e., transport), lodging, banking, government (i.e., consulates, police stations), and medical services. Entertainment data 218 includes local entertainment options based on the identified location of the user and can include items such as, concerts, plays, films, musicals, and museums. Other data 220 includes specific interests defined by the user that are external of the information detailed by retail data 214, services data 216, and entertainment data 218 or specific interests defined by the user that are internal of the information detailed by retail data 214, services data 216, and entertainment data 218. An example of a specific interest defined by the user that is external of the information detailed includes local historical sites, since local historical sites might not be included in retail data 214, services data 216, and entertainment data 218. An example of a specific interest defined by the user that is internal of the information detailed includes local cuisine to the ecosystem (i.e., general cluster, subcluster), where the local cuisine is a subcategory of information provided by retail data 214 (i.e., restaurants) that differentiates from other cuisine nonlocal to the ecosystem (e.g., chain restaurants).

Environmental data 222 represents surrounding information based on a location that the singularity recommendation program identifies for the user, where environmental data 222 can be categorized in geolocation clusters similar to ecosystem data 212. As discussed in the example above, the singularity recommendation program identifies a location for the user as the international airport in Tokyo, Japan when a mobile device (i.e., client device 104) connects to the local cellular network or public Wi-Fi. The singularity recommendation program can utilize a general cluster of environmental data 222 for Japan (i.e., country based) and a subcluster of environmental data 222 for Tokyo (i.e., city based). Furthermore, the subcluster of environmental data 222 can be further divided into portion based on neighborhoods or general areas within the subcluster, therefore environmental data 222 that is most relevant to the user is determined by the singularity recommendation program. Environmental data 222 provides a third context for the singularity recommendation that the singularity recommendation program generates. In this embodiment, environmental data 222 includes climate data 224, locality data 224, and social data 228.

Climate data 224 include local historic, present, and predicted weather information based on the identified location for the user and can include items such as, precipitation levels, precipitation types, humidity levels, temperature, season type, pollen levels, pollutant level, and any other weather information available from a public source. Locality data 226 includes government and legislative rules specific to the identified location for the user, where the local data 226 can be based on the geolocation clusters discussed above and whether or not the user is local to the area or visiting (i.e., business, leisure). Social data 228 includes current trends and news specific to the identified location for the user and can include items such as, fashion trends, food trends, social trends, and current news. The singularity recommendation program has the ability to associate environmental data 222 to personal data 22 and/or ecosystem data 212. For example, social data 212 includes details regarding a popular food trend incorporated in restaurant A, where retail data 214 includes information for restaurant A since restaurant A is specific to the identified location for the user.

Consumption engine 110 of singularity recommendation program 108 receives the structured and unstructured data for the user designated personal data 202 to provide a first context when generating a singularity recommendation and develops relationships between the information present in personal data 202. Subsequent to singularity recommendation program 108 identifying a location for the user at a particular time (i.e., time-based trigger event, connection-based trigger event), singularity recommendation program 108 determines ecosystem data 212 (i.e., second context) and environmental data 222 (i.e., third context). Singularity recommendation program 108 utilizes inference engine 112 to deduct behavioral patterns of the user (i.e., expected travels, expected reservations) based on personal data 202, ecosystem data 212, environmental data 222, and relationships developed by consumption engine 110. Singularity recommendation program 108 utilizes decision engine 114 to generate the singularity recommendation based on the deducted behavioral patterns of the user by inference engine 112.

Figure 3:
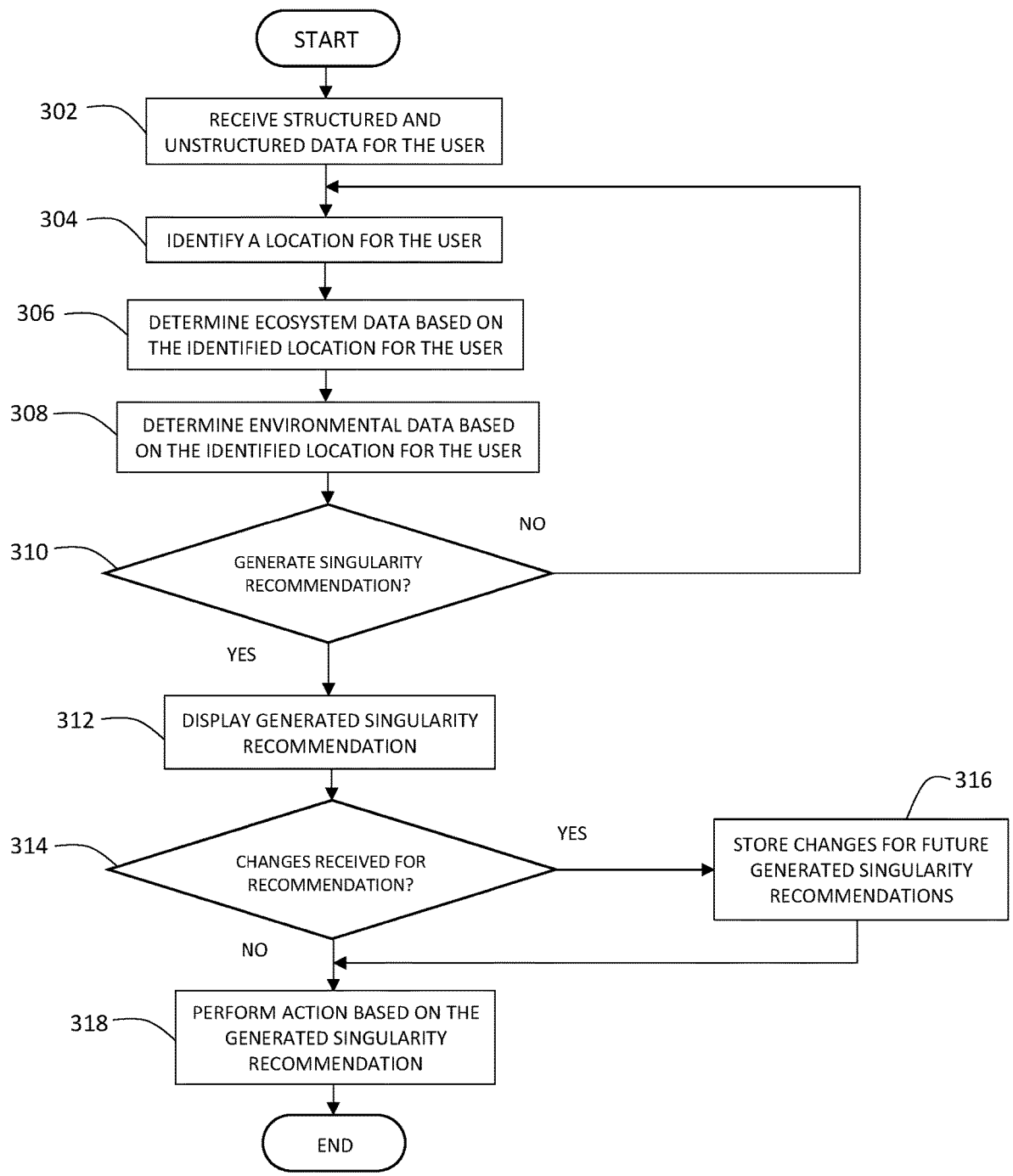
FIG. 3 is an operational flowchart of a singularity recommendation program for generating a singularity recommendation to a user, in accordance with an embodiment of the present invention.

FIG. 3 is an operational flowchart of a singularity recommendation program for generating a singularity recommendation to a user, in accordance with an embodiment of the present invention.

Singularity recommendation program 108 receives structured and unstructured data for the user (302). In this embodiment, singularity recommendation program 108 receives structured and unstructured data of the user based on established security preferences as defined by the user and provides a first context for generating the singularity recommendation to the user. Singularity recommendation program 108 allows for the user to establish what data is sourced for the user and from where the data is sourced when establishing security preferences. If the data is not publicly available, the user can provide singularity recommendation program 108 verification credentials in the form of a username and password for accessing and receiving the data in predetermined intervals (e.g., every 24 hours). As previously discussed with respect to FIG. 2, the structured and unstructured data presents personal data for the user that includes consumption data, financial data, behavioral data, and relationship data. Singularity recommendation program 108 can utilize an ingestion engine to process the structured and unstructured data for the user to establish relationships between the data sets. For example, singularity recommendation program 108 has the ability to establish a relationship between a calendar entry (e.g., business meeting on March $1^{st}$ at 1 pm) for the user and a posted meal purchase on a financial statement on the same date for the user. Singularity recommendation program 108 determines that the calendar entry for the business meeting occurred at a restaurant based on the posted meal purchase on the financial statement associated with the user. In another example, singularity recommendation program 108 has the ability to establish a relationship between a calendar entry (e.g., vacation dates March $1^{st}$ through March $7^{th}$), a geotag on a social media post (e.g., restaurant in Sydney), and a posted ride share purchase on a financial statement with a timeframe of the calendar entry. Singularity recommendation program 108 determines the posted ride share purchase occurred in Sydney while the user was on vacation.

Singularity recommendation program 108 identifies a location for the user (304). In this embodiment, singularity recommendation program 108 identifies the location for the uses according to a time-based trigger event (e.g., set time intervals). For example, singularity recommendation program 108 can identify the location for the user in a default time interval (e.g., every hour) or in a user defined time interval (e.g., every time interval) to minimize how often a client device associated with the user has to query for the location information. The location for the user can include a general cluster, a subcluster, and a portion of a subcluster for identifying where a user is located. For example, a general cluster can include a country (e.g., South Korea), a subcluster can include a city (i.e., Seoul), and a portion of the subcluster can include a neighborhood (i.e., Itaewon). In other embodiments, singularity recommendation program 108 identifies a location for the user according to a connection-based trigger event. Singularity recommendation program 108 can identify a location for the user for instances when a communication connection is established between the client device of the user and a surrounding network (i.e., cellular, Wi-Fi). For example, as a user arrives on a flight from New York to Tokyo, singularity recommendation program 108 determines a cellular provider has changed on the client device associated with the user and identifies the location for the user based on the new cellular connection. In another example, as a user arrives at a hotel for an overnight stay, singularity recommendation program 108 determines the client device associated with the user has established an internet connect with a local Wi-Fi network, where an IP address is associated with a particular location (i.e., the hotel).

Singularity recommendation program 108 determines ecosystem data based on the identified location for the user (306). In this embodiment, singularity recommendation program 108 determines ecosystem data based on the identifies location for the user and categorizes the ecosystem data based on geolocation clusters. As previously discussed, the geolocation clusters are based on a general cluster, a plurality of subclusters of the general cluster, and one or more portions of a subcluster from the plurality of subclusters. Singularity recommendation program 108 utilizes the geolocation clusters to determine ecosystem data relevant to the user based on the identified location for the user, the received structured and unstructured data (i.e., personal data), and the established relationships between the data sets. As previously discussed with regards to FIG. 2, the ecosystem data can include retail data, service data, entertainment data, and other data, where the other data includes specific interests defined by the user that are external and/or internal to the information detailed in the retail data, service data, and entertainment data. The ecosystem data provides a second context for generating the singularity recommendation to the user.

Singularity recommendation program 108 determines environmental data based on the identified location for the user (308). In this embodiment, singularity recommendation program 108 determines environmental data based on the identified location for the user to establish a third context for generating the singularity recommendation. As previously discussed with regards to FIG. 2, environmental data can include climate data, locality data, and social data for the identified location for the user. Singularity recommendation program 108 categorizes the environmental data based on the geolocation clusters, similar to the personal data and the ecosystem data. It is to be noted that various portions of the environmental data are more geolocation specific compared to other portions of the environmental data. For example, climate data is more geolocation specific compared to social data, since climate data is most relevant at the identified location (i.e., portion of subcluster) of the user versus the general location (i.e., general cluster) of the user.

Singularity recommendation program 108 determines whether to generate a singularity recommendation (decision 310). In the event singularity recommendation program 108 determines to generate the singularity recommendation ("yes" branch, decision 310), singularity recommendation program 108 displays the generated singularity recommendation (312). Singularity recommendation program 108 determines to generate the singularity recommendation by utilizing a recommendation framing algorithm in combination with a machine learning algorithm to initialize a prediction based on the specific user and the multiple contexts. the event singularity recommendation program 108 determines not to generate the singularity recommendation ("no" branch, decision 310), singularity recommendation program 108 reverts back to identify a location for the user (304).

In one example, singularity recommendation program 108 identifies a behavioral pattern, where the user utilizes a ride sharing service prior to a reservation at a restaurant when traveling abroad on vacation. Singularity recommendation program 108 received personal data that indicated a ride share purchase in a predetermined time prior to a restaurant reservation, as indicated by a first entry in an electronic calendar associated with the user. Singularity recommendation program 108 identifies an expenditure in a financial statement (e.g., credit card statement) associated with the user to a receipt based on a time and date of the restaurant reservation. Furthermore, singularity recommendation program 108 determines this behavioral pattern has previously occurred six times (i.e., number of occurrences) in the past two years (i.e., specified time frame) and based on a plurality of entries in the electronic calendar associated with the user, singularity recommendation program 108 determines the user was traveling aboard on vacation during the six times in the past two years. The behavioral pattern identified above by singularity recommendation program 108 above provides the first context for generating the singularity recommendation.

Additionally, singularity recommendation program 108 identified a location for the user as central Tokyo, Japan and determined ecosystem data (i.e., second context) for the identified location that includes a list of available ride share services and a list of restaurants in geolocation cluster associated with the identified location. Singularity recommendation program 108 previously received personal data for the user, where a third entry in the electronic calendar associated with the user indicated the user is traveling abroad on vacation (i.e., Tokyo, Japan). Singularity recommendation program 108 determined environmental data (i.e., third context) based on the location for the user, where climate data in the environmental data predicts precipitation. Based on the previously identified behavior pattern, singularity recommendation program 108 determines to generate a singularity recommendation stating a special offer is available for ride share service AB on March $1^{st}$ due to the probability of rain and a discount to restaurant BC, where restaurant BC serves cuisine local to the area as preferred by the user when traveling abroad. Furthermore, singularity recommendation program 108 has the ability to reduce the list of ride share services from the ecosystem data based on the environmental data, where singularity recommendation program 108 removes ride share services that don't include an enclosed mode of transport (e.g., electric moped) and don't require parking of the mode of transport due singularity recommendation program 108 determining there is limited parking available at the identified location for the user (i.e., Tokyo, Japan).

In another example, singularity recommendation program 108 identifies a behavior pattern, where the user reserves a home rental when traveling to a remote work location to resolve a server issue a client is experiencing. Singularity recommendation program 108 received personal data that indicated a home rental reservation in a predetermined time prior to traveling to the remote location, as indicated by a first entry in an electronic calendar associated with the user.

Singularity recommendation program 108 identifies an expenditure in a financial statement on a company credit card supporting the home rental reservation. Singularity recommendation program 108 determines this behavior pattern has occurred five times in the present year and based on a plurality of entries in the electronic calendar associated with the user, singularity recommendation program 108 determines was traveling to customer sites to resolve technical issues. Furthermore, singularity recommendation program 108 determines the five occurrences of the home rental reservation never exceeded a cost of $150 per night, averaged to $135 per night, and had a minimum customer review rating of 4.7 out of 5.0. The behavioral pattern identified above by singularity recommendation program 108 above provides the first context for generating the singularity recommendation.

Additionally, singularity recommendation program 108 identified a location for the user Charlotte, N.C. and determine ecosystem data (i.e., second context) indicates for the identified location a list of available home rentals from a website previously utilized by the user. Singularity recommendation program 108 previously received personal data for the user, where a third entry in the electronic calendar associated with the user indicated a duration of stay for the user of March $1^{st}$ to March $7^{th}$ to resolve a technical issue at a customer site. Singularity recommendation program 108 determined environmental data (i.e., third context) based on the location for the user, where social data included news reports of street closure due to construction. Based on the previously identified behavior pattern, singularity recommendation program 108 determines to generate a singularity recommendation stating a list of top five home rentals available for March $1^{st}$ through March $7^{th}$ that avoid street closures due to construction, where the top five home rentals are below $150 per night and includes a minimum customer review rating of 4.7 out of 5.0. Singularity recommendation program 108 has the ability to search the list of available home rentals from the website previously utilized but the user to identified home rentals at the identified location of the user based on the behavioral pattern identified by singularity recommendation program 108.

Singularity recommendation program 108 displays the generated singularity recommendation (312). In this embodiment, singularity recommendation program 108 displays the generated singularity recommendation as a statement on a client device associated with the user. Singularity recommendation program 108 can display the generated singularity recommendation as an application notification, text message, email, or popup message in user interface on the client device. In one example, singularity recommendation program 108 displays a generated singularity recommendation stating a special offer is available for ride share service AB on March $1^{st}$ due to the probability of rain and a discount to restaurant BC, where restaurant BC serves cuisine local to the area as preferred by the user when traveling abroad. An example statement that singularity recommendation program 108 displays is, "A special offer is available for ride share service AB on March $1^{st}$ due to the probability of rain in your area a discount to restaurant BC that serves cuisine local to the area." Singularity recommendation program 108 can highlight one or more words of the statement, where the user can provide changes and alter the recommendation. In this example, singularity recommendation program 108 highlights the words "ride share AB", "March $1^{st}$", and "restaurant BC", where a user can select each word and singularity recommendation program 108 can provide alternatives. For "ride share service AB", singularity recommendation program 108 can provide alternative "ride share service DE" and "ride share service FG". For "March $1^{st}$", singularity recommendation program 108 can display a calendar overlay on the displayed statement, where the user can select a specific date (e.g., March $4^{th}$) in the calendar overlay to replace "March $1^{st}$". For "restaurant BC", singularity recommendation program 108 can provide alternative "restaurant DE" and restaurant FG". Furthermore, singularity recommendation program 108 can hyperlink the words "special offer", "rain", and "discount" from the statement to access the websites for "rides share AB", the local weather report, and "restaurant BC", respectively to allow the user to enquire about additional details.

In another example, singularity recommendation program 108 displays a generated singularity recommendation stating a list of top five home rentals available for March $1^{st}$ through March $7^{th}$ that avoid street closures due to construction, where the top five home rentals are below $150 per night and includes a minimum customer review rating of 4.7 out of 5.0. An example statement that singularity recommendation program 108 displays is, "Provided are list of top five home rentals for March $1^{st}$ through March $7^{th}$ that avoid local street closures, are below $150 per night, and include a minimum customer review rating of 4.7 out of 5.0." Singularity recommendation program 108 highlights multiple words of the statement, where the user can provide changes and alter the recommendation. In this example, singularity recommendation program 108 highlights the words "five", "March $1^{st}$", "March $7^{th}$", "$150", and "4.7", where a user can select each word and singularity recommendation program 108 can provide alternatives. For "five", singularity recommendation program 108 can provide alternative values (e.g., ranging from 1 to 10) for how many home rentals should be included in the list. For "March $1^{st}$" and "March $7^{th}$", singularity recommendation program 108 can display a calendar overlay on the displayed statement, where the user can select a specific date in the calendar overlay to replace the check-in and check-out date. For "$150", singularity recommendation program 108 can provide alternative prices values (e.g., ranging from $50 to $200) and for "4.7", singularity recommendation program 108 can provide alternative rating values (e.g., ranging from 0.0 to 5.0). Furthermore, singularity recommendation program 108 can hyperlink the words "home rentals" and "street closures" from the statement to access the websites for the home rentals and the news report regarding the street closures to allow the user to enquire about additional details.

Singularity recommendation program 108 determines whether changes were received for the generated singularity recommendation (decision 314). In the event singularity recommendation program 108 determines changes were received for the generated singularity recommendation ("yes" branch, decision 314), singularity recommendation program 108 stores the changes for further generated singularity recommendations (316). In the event singularity recommendation program 108 determines changes were not received for the generated singularity recommendation ("no" branch, decision 314), singularity recommendation program 108 preforms an action based on the generated singularity recommendation (318).

Singularity recommendation program 108 stores the changes for future generated singularity recommendations (316). Storing the changes to the generated singularity recommendation allows for singularity recommendation program 108 to learn through feedback and custom tailor future singularity recommendations to the user. In one example, singularity recommendation program 108 displayed the recommendation, "A special offer is available for ride share service AB on March 1$^{st}$ due to the probability of rain in your area a discount to restaurant BC that serves cuisine local to the area." Singularity recommendation program 108 determined that "ride share service AB" was changed by the user to a second option of "ride share service DE" and singularity recommendation program 108 stores the change for future generated singularity recommendations, where singularity recommendation program 108 may provide "ride share service DE" as the first option and "ride share service AB" as the second option. In another example, singularity recommendation program 108 displayed the recommendation, "Provided are list of top five home rentals for March 1$^{st}$ through March 7$^{th}$ that avoid local street closures, are below $150 per night, and include a minimum customer review rating of 4.7 out of 5.0." Singularity recommendation program 108 determined that "five" home rentals was changed by the user to "three" home rentals and "4.7" was changed to "4.9" to reduce the minimum customer review rating range. Singularity recommendation program 108 stores the changes for future generated singularity recommendations, where singularity recommendation program 108 may provide a smaller list of home rentals (three versus five) and include home rentals with a higher minimum customer review (4.9 versus 4.7).

Singularity recommendation program 108 preforms an action based on the generated singularity recommendation (318). In one embodiment, singularity recommendation program 108 accesses a website based on the generated singularity recommendation, where singularity recommendation program 108 prepopulates one or more field in the website based on the generated singularity recommendation. In one example, singularity recommendation program 108 accesses displayed the recommendation, "A special offer is available for ride share service AB on March 1$^{st}$ due to the probability of rain in your area a discount to restaurant BC that serves cuisine local to the area." Singularity recommendation program 108 determines the user has selected the hyperlinked word "discount", where singularity recommendation program 108 accesses the website for "restaurant BC" and prepopulates a date field with "March 1$^{st}$" for an online table reservation. In another example, singularity recommendation program 108 accesses displayed the recommendation, "Provided are list of top five home rentals for March 1$^{st}$ through March 7$^{th}$ that avoid local street closures, are below $150 per night, and include a minimum customer review rating of 4.7 out of 5.0." Singularity recommendation program 108 determines the user has selected the hyperlinked words "home rentals", where singularity recommendation program 108 accesses the home rental website and prepopulates a date field (e.g., check-in March 1$^{st}$ and check-out March 7$^{th}$), a price range field (e.g., $0 to $150), and a customer review range field (e.g., 4.7 to 5.0). If the customer provided changes to the generated singularity recommendation (e.g., customer review range field range 4.9 to 5.0), the changes are reflected in the prepopulated fields in the website and singularity recommendation program 108 repopulates the one or more field in the website with the user provided changes. In other embodiments, singularity recommendation program 108 can provide an option to the user to bookmark or save the generated singularity recommendation for further review and/or future action, where singularity recommendation program 108 allows the user to view previously stored generates singularity recommendations.

Figure 4:
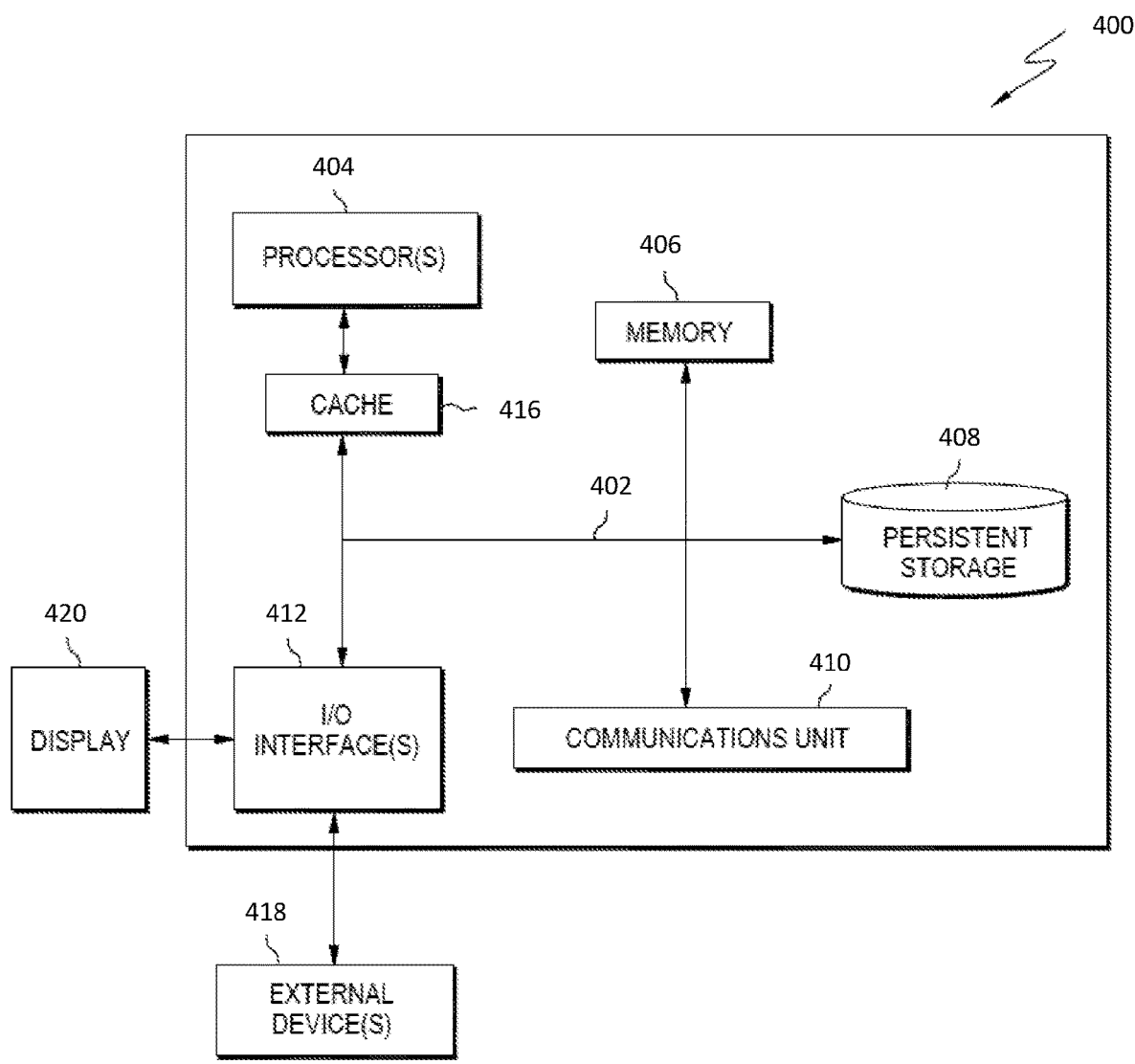
FIG. 4 is a block diagram of components of a computer system, such as the server computer of FIG. 1, in accordance with an embodiment of the present invention.

FIG. 4 depicts computer system 400, where server computer 102 is an example of computer system 400 that can include singularity recommendation program 108. The computer system includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
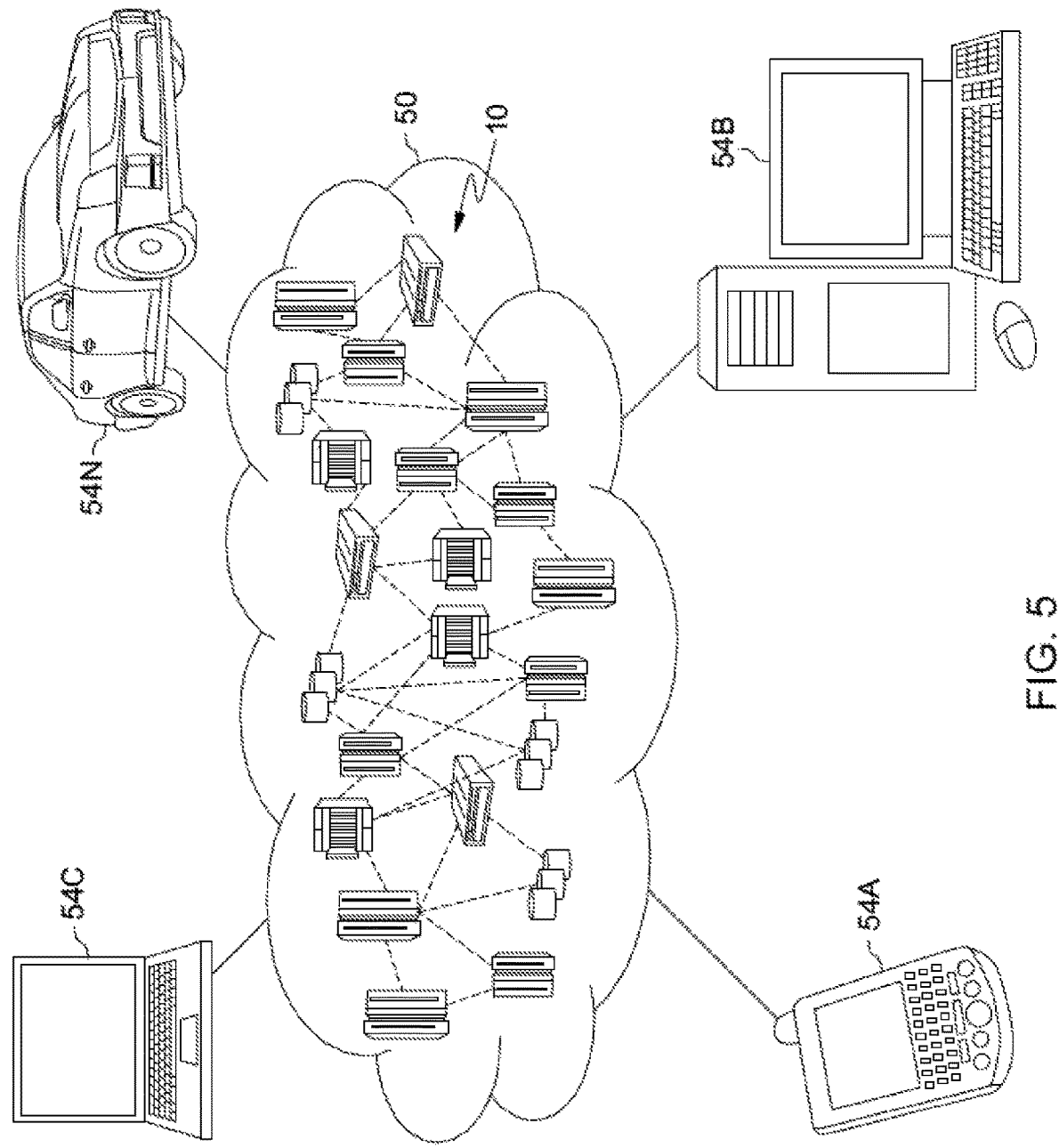
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
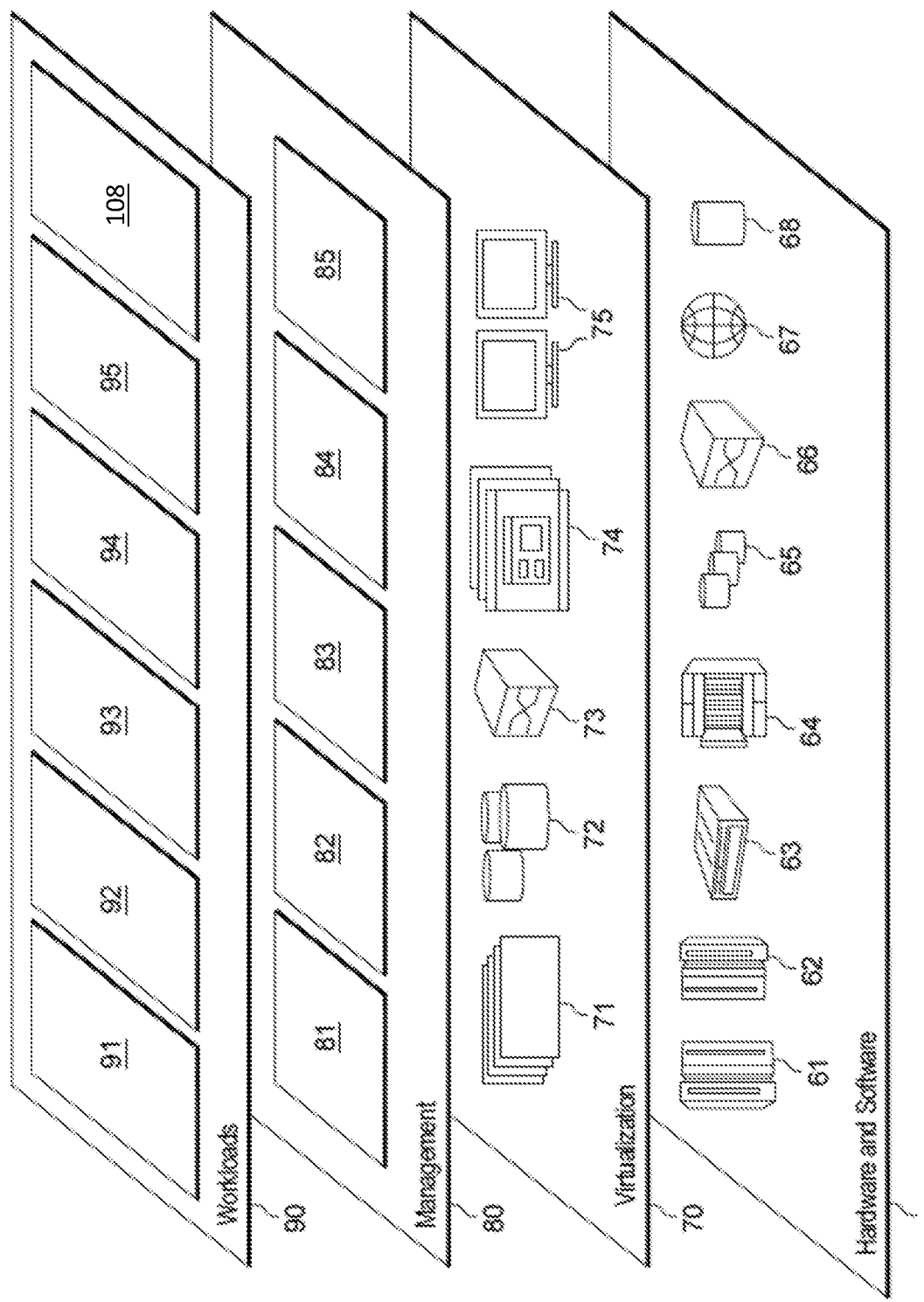
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and singularity recommendation program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, structured and unstructured data for a user, wherein the structured and unstructured data for the user provide a first context for generating a singularity recommendation;
   responsive to identifying a location for the user, determining, by one or more processors, ecosystem data based on the location for the user, wherein the ecosystem data provides a second context for generating the singularity recommendation;
   determining, by one or more processors, environmental data based on the location for the user, where the environmental data provides a third context for generating the singularity recommendation;
   generating, by one or more processors, the singularity recommendation by utilizing a recommendation framing algorithm and a machine learning algorithm to initialize a prediction based on a behavioral pattern of the user, the first context, the second context, and the third context directed to the user, wherein the behavioral pattern comprises a number of occurrences of a pattern within a predetermined time period;
   determining, by one or more processors, the behavioral pattern based on the structured and unstructured data that includes personal data for the user which comprises consumption data, financial data, behavioral data, and relationship data, wherein the behavioral pattern further provides the first context for generating the singularity recommendation;
   displaying, by one or more processors, the singularity recommendation in a user interface on a client device associated with the user;
   performing, by one or more processors, an action which comprises prepopulating one or more fields in a website based on the singularity recommendation;
   responsive to determining a connection-based trigger event has occurred, identifying, by one or more processors, a communication connection established between the client device of the user and a surrounding network comprising Wi-Fi; and
   identifying, by one or more processors, the location for the user based on the communication connection, wherein the location for the user is categorized based on a general cluster, a single subcluster out of a plurality of clusters of the general cluster, and one or more portions of the single subcluster,
   wherein an internet protocol (IP) address of the Wi-Fi is associated with the location for the user.

2. The method of claim 1, wherein the ecosystem data represents potential products and services available based on the location of the user selected from a group consisting of: retail data, services data, and entertainment data, and the ecosystem data is determined by utilizing geolocation clusters.

3. The method of claim 2, wherein the environmental data represents surrounding information based on the location of the user selected from a group consisting of: climate data, locality data, and social data, and the environmental data is categorized based on the geolocation clusters.

4. The method of claim 1, further comprising:
   responsive to receiving one or more alterations from the user to the singularity recommendation displayed in the user interface on the client device, storing, by one or more processors, the one or more alteration to the singularity recommendations for utilization in subsequent generated singularity recommendations; and
   performing, by one or more processors, the action further based on the received one or more alterations from the user.

5. The method of claim 4, wherein the singularity recommendation is a statement that includes at least one highlighted word and one hyperlinked words, wherein the at least one highlighted word represents a portion of the singularity recommendation that the user can alter, and wherein the at least one hyperlinked word directs the user to the website with the prepopulated one or more fields.

6. A computer program product comprising:
   one or more computer readable storage media and program instructions stored on at least one of the one or more storage media, the program instructions comprising:
   program instructions to receive structured and unstructured data for a user, wherein the structure and unstructured data for the user provide a first context for generating a singularity recommendation;
   program instructions to, responsive to identifying a location for the user, determine ecosystem data based on the location for the user, wherein the ecosystem data provides a second context for generating the singularity recommendation;
program instructions to determine environmental data based on the location for the user, where the environmental data provides a third context for generating the singularity recommendation;
program instructions to generate the singularity recommendation by utilizing a recommendation framing algorithm and a machine learning algorithm to initialize a prediction based on a behavioral pattern of the user, the first context, the second context, and the third context directed to the user, wherein the behavioral pattern comprises a number of occurrences of a pattern within a predetermined time period;
program instructions to determine the behavioral pattern based on the structured and unstructured data that includes personal data for the user which comprises consumption data, financial data, behavioral data, and relationship data, wherein the behavioral pattern further provides the first context for generating the singularity recommendation;
program instructions to display the singularity recommendation in a user interface on a client device associated with the user;
program instructions to perform an action which comprises prepopulating one or more fields in a website based on the singularity recommendation;
program instructions to, responsive to determining a connection-based trigger event has occurred, identify a communication connection established between the client device of the user and a surrounding network comprising Wi-Fi; and
program instructions to identify the location for the user based on the communication connection, wherein the location for the user is categorized based on a general cluster, a single subcluster out of a plurality of clusters of the general cluster, and one or more portions of the single subcluster,
wherein an internet protocol (IP) address of the Wi-Fi is associated with the location for the user, and
wherein the structure and unstructured data comprises an electronic calendar and an expenditure associated with the user.

7. The computer program product of claim 6, wherein the ecosystem data represents potential products and services available based on the location of the user selected from a group consisting of: retail data, services data, and entertainment data, and the ecosystem data is determined by utilizing geolocation clusters.

8. The computer program product of claim 7, wherein the environmental data represents surrounding information based on the location of the user selected from a group consisting of: climate data, locality data, and social data, and the environmental data is categorized based on the geolocation clusters.

9. The computer program product of claim 6, further comprising program instructions, stored on the one or more computer readable storage media, which when executed by a processor, cause the processor to:
responsive to receiving one or more alterations from the user to the singularity recommendation displayed in the user interface on the client device, store the one or more alteration to the singularity recommendations for utilization in subsequent generated singularity recommendations; and
perform the action further based on the received one or more alterations from the user.

10. The computer program product of claim 9, wherein the singularity recommendation is a statement that includes at least one highlighted word and one hyperlinked words, wherein the at least one highlighted word represents a portion of the singularity recommendation that the user can alter, and wherein the at least one hyperlinked word directs the user to the website with the prepopulated one or more fields.

11. A computer system comprising:
one or more computer processors;
one or more computer readable storage media; and
program instructions stored on the computer readable storage media for execution by at least one of the one or more computer processors, the program instructions comprising:
program instructions to receive structured and unstructured data for a user, wherein the structured and unstructured data for the user provide a first context for generating a singularity recommendation;
program instructions to, responsive to identifying a location for the user, determine ecosystem data based on the location for the user, wherein the ecosystem data provides a second context for generating the singularity recommendation;
program instructions to determine environmental data based on the location for the user, where the environmental data provides a third context for generating the singularity recommendation;
program instructions to generate the singularity recommendation by utilizing a recommendation framing algorithm and a machine learning algorithm to initialize a prediction based on a behavioral pattern of the user, the first context, the second context, and the third context directed to the user, wherein the behavioral pattern comprises a number of occurrences of a pattern within a predetermined time period;
program instructions to determine the behavioral pattern based on the structured and unstructured data that includes personal data for the user which comprises consumption data, financial data, behavioral data, and relationship data, wherein the behavioral pattern further provides the first context for generating the singularity recommendation;
program instructions to display the singularity recommendation as an application notification in a user interface on a client device associated with the user;
program instructions to perform an action which comprises prepopulating one or more fields in a website based on the singularity recommendation;
program instructions to, responsive to determining a connection-based trigger event has occurred, identify a communication connection established between the client device of the user and a surrounding network comprising Wi-Fi;
program instructions to identify the location for the user based on the communication connection, wherein the location for the user is categorized based on a general cluster, a single subcluster out of a plurality of clusters of the general cluster, and one or more portions of the single subcluster,
wherein an internet protocol (IP) address of the Wi-Fi is associated with the location for the user.

12. The computer system of claim 11, wherein the ecosystem data represents potential products and services available based on the location of the user selected from a group consisting of: retail data, services data, and entertainment data, and the ecosystem data is determined by utilizing geolocation clusters.

13. The computer system of claim 11, further comprising program instructions, stored on the one or more computer readable storage media, which when executed by a processor, cause the processor to:
  responsive to receiving one or more alterations from the user to the singularity recommendation displayed in the user interface on the client device, store the one or more alteration to the singularity recommendations for utilization in subsequent generated singularity recommendations; and
  perform an action further based on the received one or more alterations from the user.

14. The computer system of claim 13, wherein the singularity recommendation is a statement that includes at least one highlighted word and one hyperlinked words, wherein the at least one highlighted word represents a portion of the singularity recommendation that the user can alter, and wherein the at least one hyperlinked word directs the user to the website with the prepopulated one or more fields.

* * * * *